United States Patent
Vossough et al.

(10) Patent No.: US 9,881,638 B1
(45) Date of Patent: Jan. 30, 2018

(54) METHOD FOR PROVIDING A NEAR-FIELD TRANSDUCER (NFT) FOR A HEAT ASSISTED MAGNETIC RECORDING (HAMR) DEVICE

(71) Applicant: Western Digital (Fremont), LLC, Fremont, CA (US)

(72) Inventors: Kris Vossough, Redwood City, CA (US); Xiaokai Zhang, Dublin, CA (US); Armen Kirakosian, Walnut Creek, CA (US); Jinwen Wang, Pleasanton, CA (US); Tsung Yuan Chen, San Ramon, CA (US); Yufeng Hu, Fremont, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 291 days.

(21) Appl. No.: 14/574,188

(22) Filed: Dec. 17, 2014

(51) Int. Cl.
*G11B 5/127* (2006.01)
*H04R 31/00* (2006.01)
*G11B 5/31* (2006.01)
*G11B 5/00* (2006.01)

(52) U.S. Cl.
CPC .......... *G11B 5/127* (2013.01); *G11B 5/31* (2013.01); *G11B 2005/0021* (2013.01)

(58) Field of Classification Search
CPC ......... G11B 13/08; G11B 5/127; G11B 5/314; G11B 5/6052; G11B 5/6088
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |

(Continued)

*Primary Examiner* — Paul D Kim
(74) *Attorney, Agent, or Firm* — Foley & Lardner LLP

(57) ABSTRACT

A method and system provides a near-field transducer (NFT) for a heat assisted magnetic recording (HAMR) transducer. The method and system include forming the disk of the NFT and forming the pin of the NFT. The disk is formed from a first material. The pin is formed from a second material different from the first material. The pin contacts the disk. At least a portion of the pin is between the disk and an air-bearing surface (ABS) location.

9 Claims, 19 Drawing Sheets

(56) References Cited

U.S. PATENT DOCUMENTS

| | | | |
|---|---|---|---|
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |

(56) References Cited

U.S. PATENT DOCUMENTS

| | | |
|---|---|---|
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |

(56) References Cited

U.S. PATENT DOCUMENTS

| | | |
|---|---|---|
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 7,996,986 B2 * | 8/2011 | Gokemeijer ............ G11B 5/314 29/603.07 |
| 8,008,912 B1 | 8/2011 | Shang et al. |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 * | 12/2011 | Hu ........................ G11B 5/3136 29/603.07 |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 * | 11/2012 | Wolf .................... G11B 5/314 360/125.74 |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 * | 1/2013 | Gao ...................... G11B 5/314 204/192.34 |
| 8,349,195 B1 | 1/2013 | Si et al. |
| 8,351,307 B1 * | 1/2013 | Wolf .................... G11B 5/314 369/112.27 |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 * | 2/2013 | Hu ........................ B24B 37/013 216/22 |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |

(56) References Cited

U.S. PATENT DOCUMENTS

| | | |
|---|---|---|
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1* | 6/2013 | Wolf .................. G11B 5/314 369/112.27 |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1* | 10/2013 | Tanner .............. G11B 5/3136 369/13.03 |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1* | 12/2013 | Yuan .................. G11B 5/3136 369/13.33 |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,834,728 B1* | 9/2014 | Hu .................... G11B 5/4866 216/17 |
| 8,971,160 B1* | 3/2015 | Yuan .................. G11B 5/40 369/13.13 |
| 9,153,277 B2* | 10/2015 | Zhao .................. G11B 5/6082 |
| 2008/0068748 A1* | 3/2008 | Olson ................. G11B 5/02 360/110 |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

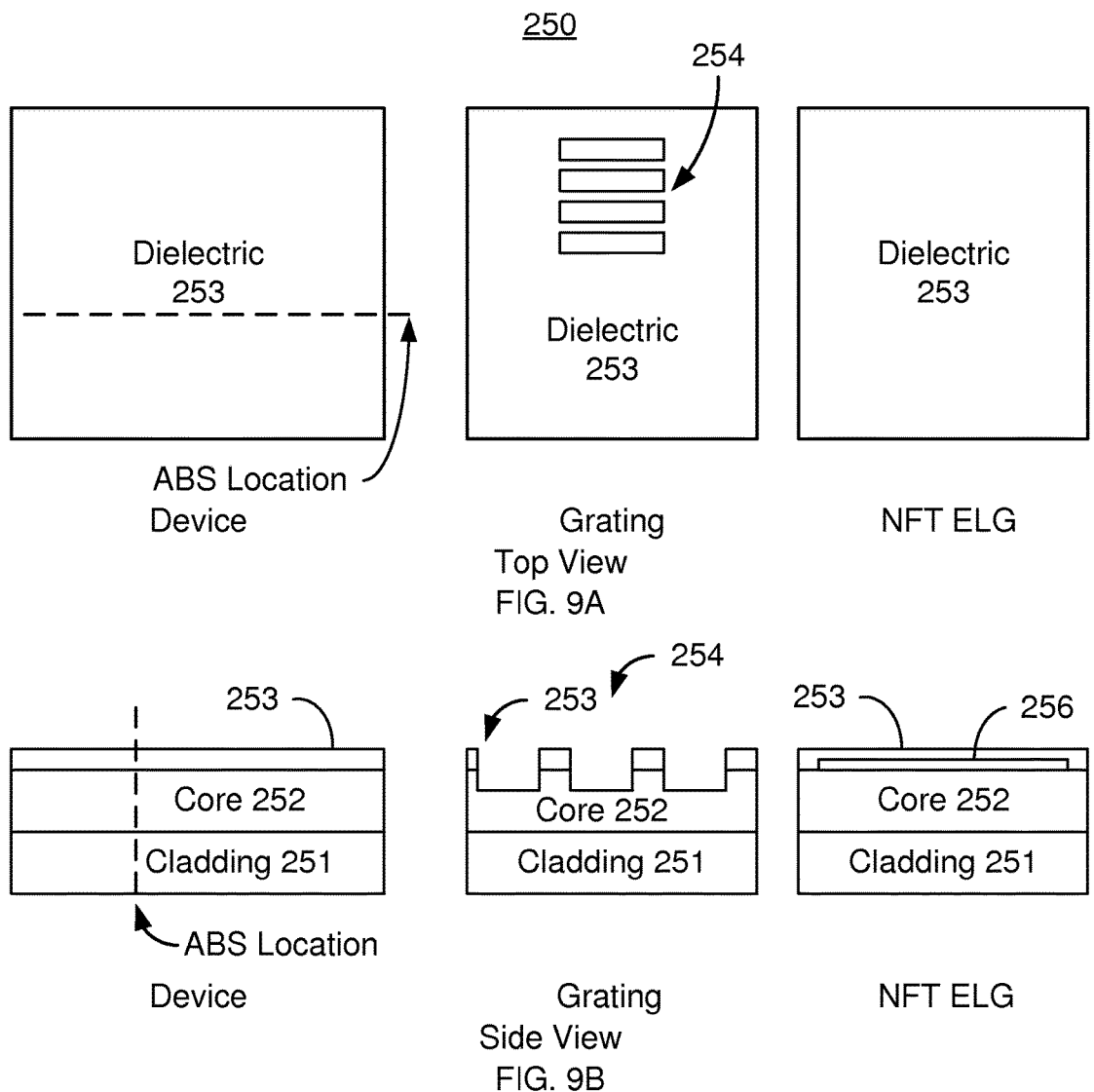

Grating Top View

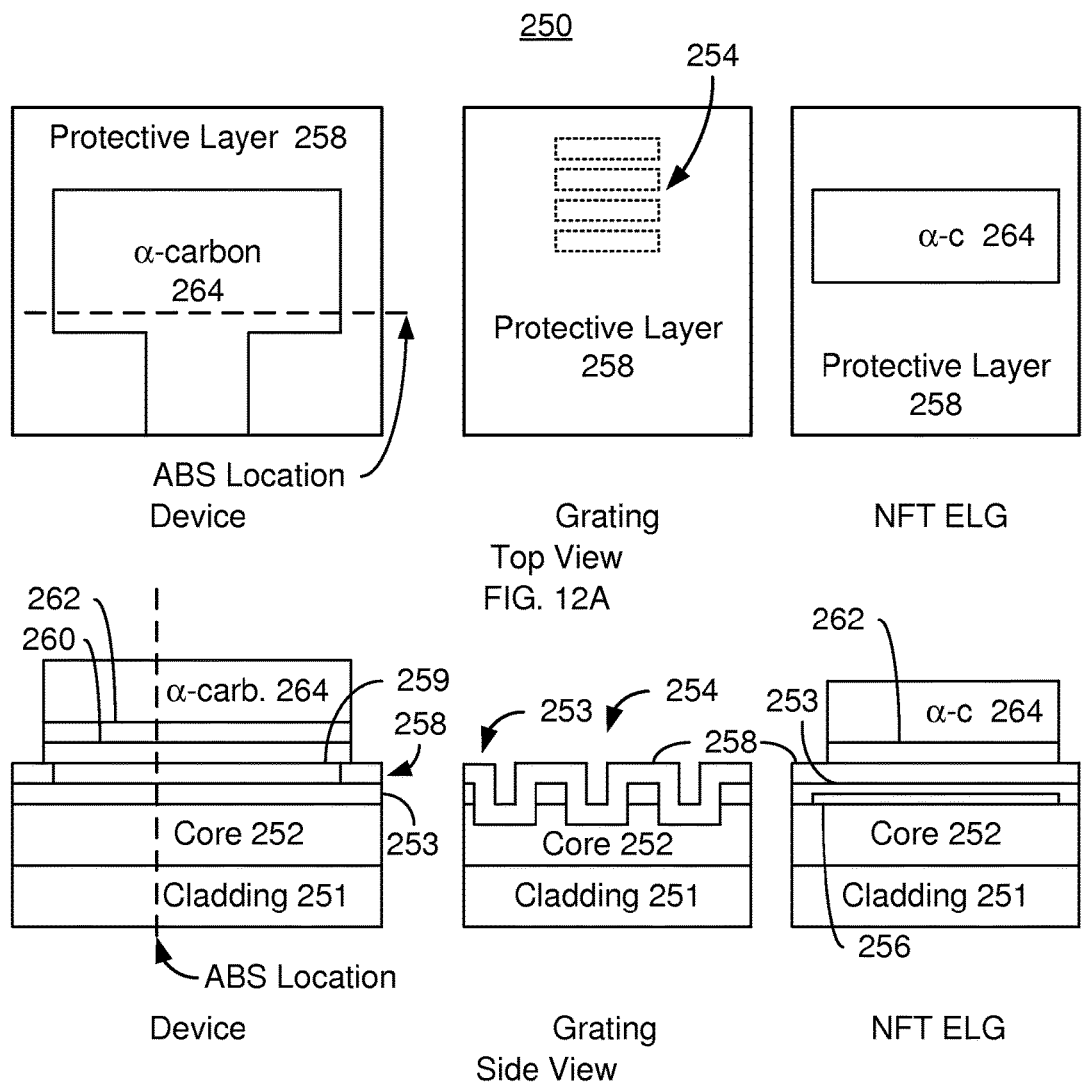

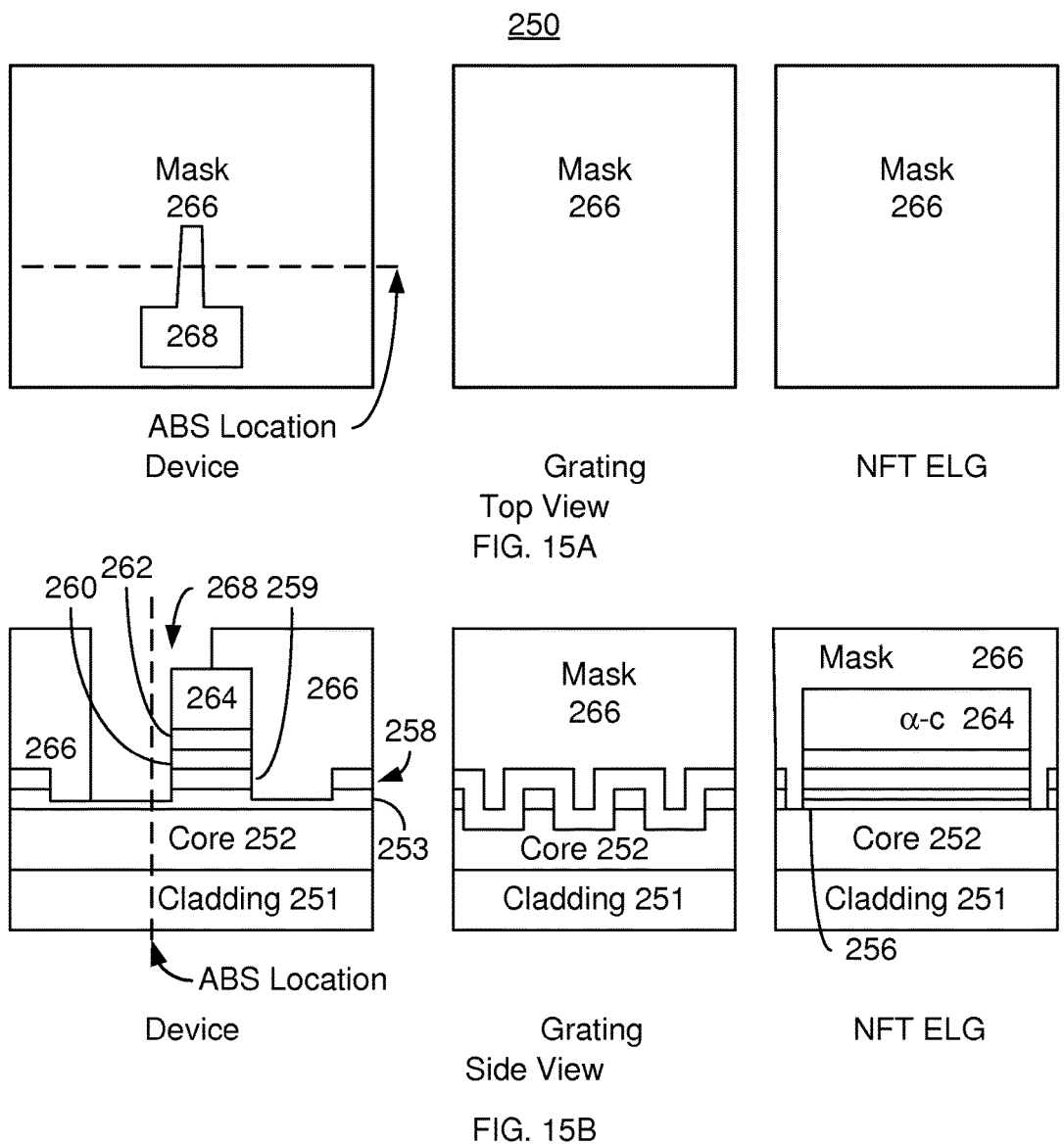

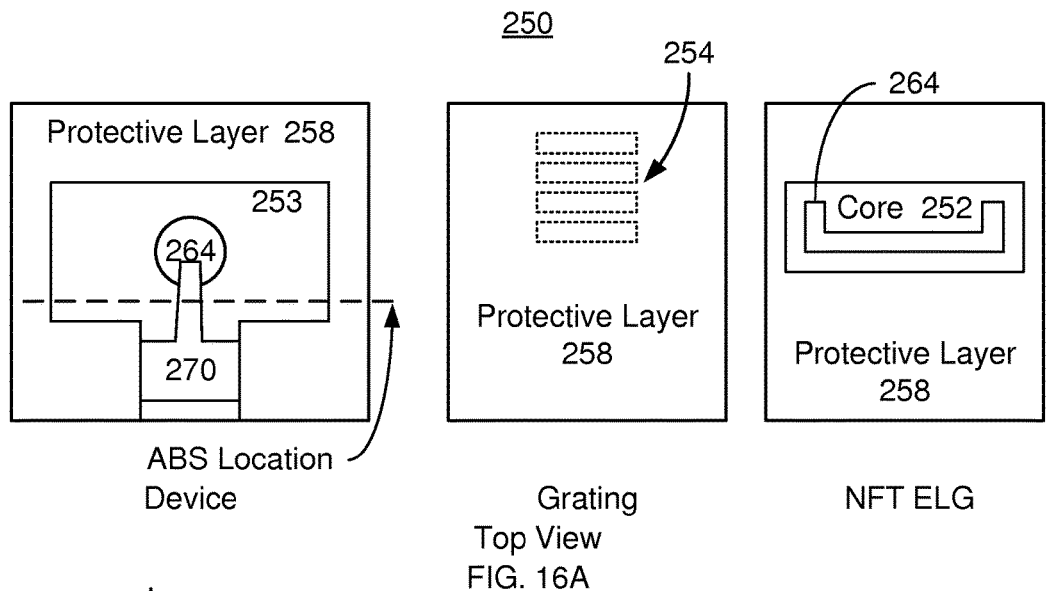
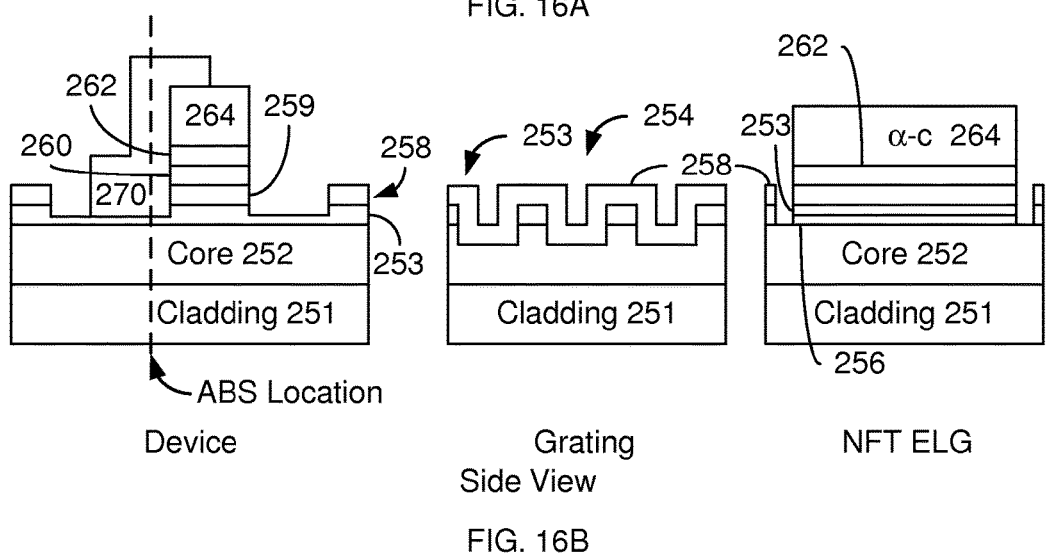
FIG. 16A
FIG. 16B

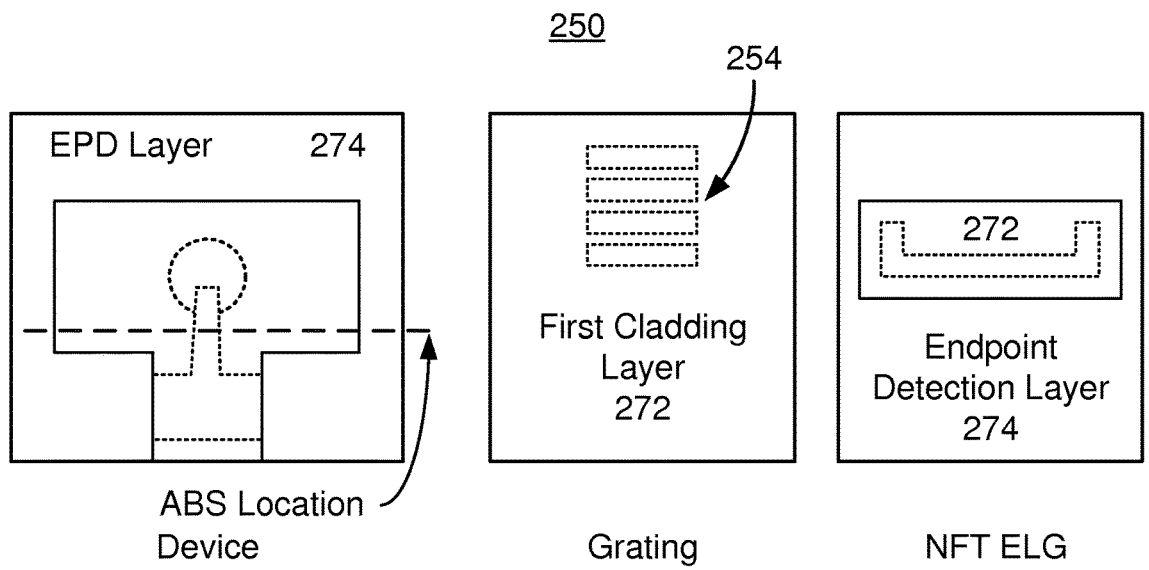
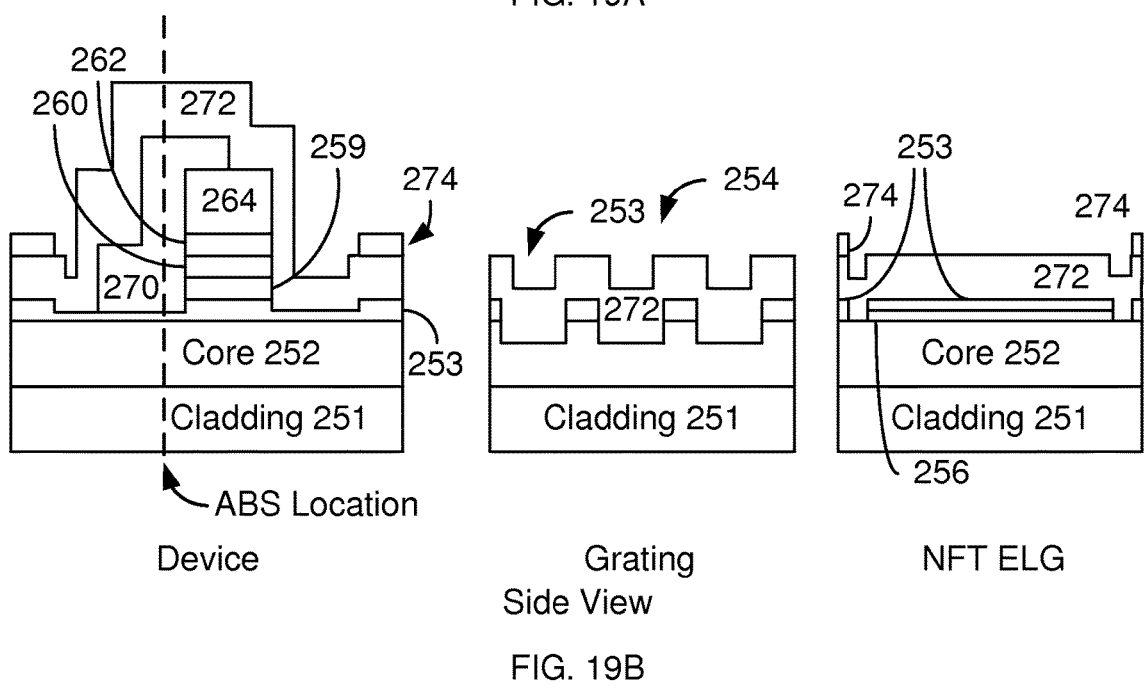
FIG. 19A
FIG. 19B

Grating
Top View

Grating
Side View

Grating Top View

Grating Top View

Device | Grating Top View | NFT ELG

Device | Grating Side View | NFT ELG

US 9,881,638 B1

METHOD FOR PROVIDING A NEAR-FIELD TRANSDUCER (NFT) FOR A HEAT ASSISTED MAGNETIC RECORDING (HAMR) DEVICE

BACKGROUND

FIG. 1 depicts a portion of a conventional heat assisted magnetic recording (HAMR) transducer 10. The conventional HAMR transducer 10 includes a conventional waveguide 12 having a conventional core 18 and cladding 14 and 16, a conventional near-field transducer (NFT) 30, and a write pole 40. The NFT 30 has a disk portion 34 and a pin portion 32. The pin portion 32 is between the disk portion 34 and the air-bearing surface (ABS). The NFT 30 is typically formed of gold or a gold alloy. The conventional HAMR transducer 10 is used in writing to a recording media and receives light, or energy, from a conventional laser (not shown).

In operation, light from a laser is coupled to the waveguide 12. Light is guided by the conventional waveguide 12 to the NFT 30 near the ABS. The NFT 30 utilizes local resonances in surface plasmons to focus the light to magnetic recording media (not shown), such as a disk. The surface plasmons used by the NFT 30 are electromagnetic waves that propagate along metal/dielectric interfaces. At resonance, the NFT 30 couples the optical energy of the surface plasmons efficiently into the recording medium layer with a confined optical spot which is much smaller than the optical diffraction limit. This optical spot can typically heat the recording medium layer above the Curie point in nanoseconds. High density bits can be written on a high coercivity medium with a pole 40 having modest magnetic field.

FIG. 2 depicts a conventional method 50 for providing the NFT 30 in the conventional HAMR transducer 10. Referring to FIGS. 1 and 2, a layer of conductive material is deposited for the NFT, via step 52. Typically the conductive material is gold. The conductive layer is masked, via step 54. The mask covers the portion of the conductive layer that will form the NFT 30. The exposed portion of the conductive layer is removed, via step 56. Step 56 typically includes performing an ion mill. The remaining portion of the conductive layer forms the NFT. Thus, the NFT 30 is formed. Fabrication of the conventional HAMR transducer 10 may then be completed.

Although the conventional method 10 may form the conventional NFT 30, there are drawbacks. In particular, the conventional NFT 30 not perform as desired. For example, due to heating during use, the pin portion 32 of the NFT 30 may undergo plastic deformation. The metals used in the NFT 30 may also undergo softening at elevated temperatures. As a result, the NFT 30 may fail during operation. Accordingly, what is needed is a system and method for improving performance of a HAMR transducer.

BRIEF DESCRIPTION OF SEVERAL VIEWS OF THE DRAWINGS

FIGS. 9A and 9B-23A and 23B are diagrams depicting various portions of an exemplary embodiment of a magnetic recording transducer during fabrication.

DETAILED DESCRIPTION OF THE PREFERRED EMBODIMENTS

Figure 1:
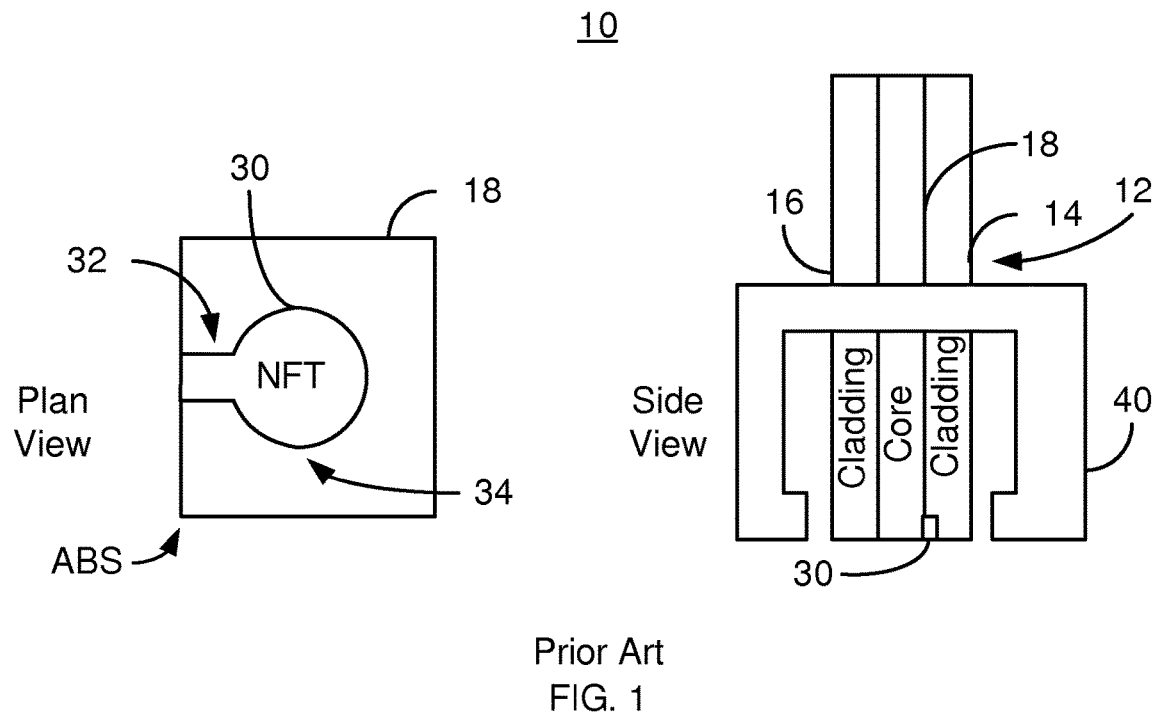
FIG. 1 is a flow chart depicting a conventional HAMR transducer.
Figure 2:
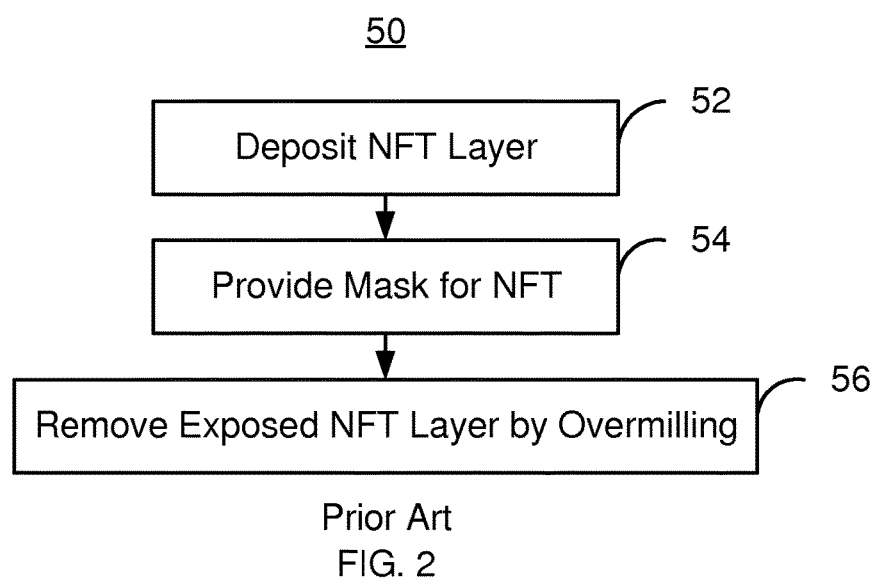
FIG. 2 is a diagram depicting a plan and side views of a conventional NFT formed using a conventional method for fabricating an NFT.
Figure 3:
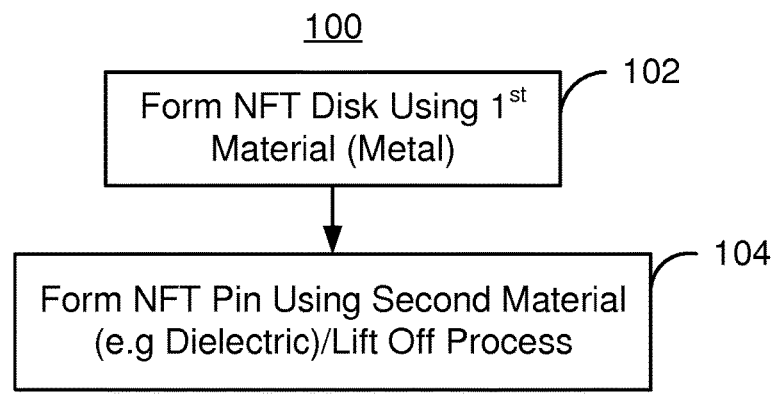
FIG. 3 is a flow chart depicting an exemplary embodiment of a method for providing a composite NFT in a HAMR transducer.

FIG. 3 depicts one embodiment of a method 100 for fabricating a composite NFT for a HAMR transducer. For simplicity, some steps may be omitted, interleaved, and/or combined. The HAMR transducer being fabricated may be part of a merged head that also includes a read head and resides on a slider in a disk drive. The method 100 is also described in the context of providing a single HAMR transducer. However, the method 100 may be used to fabricate multiple transducers at substantially the same time. The method 100 is also described in the context of particular layers. However, in some embodiments, such layers may include multiple sub-layers. The method 100 also may commence after formation of other portions of the HAMR transducer. In one embodiment, the method 100 commences after formation of portions of the waveguide, such as a core. Thus, a flat surface for formation of subsequent structures may have been provided. Certain steps of the method 100 may be combined, omitted, performed in another order and/or interleaved.

The disk of the NFT is formed from first material(s), via step 102. In some embodiments, the first material(s) used for the NFT disk are metallic. For example, gold or a gold alloy may be used. However, in other embodiments, other materials including but not limited to other alloys and/or a combination of metals and insulators may be used. Although termed a disk herein, the disk of the NFT need not have a circular footprint. Other shapes, including shapes having apertures therein might be used. For example, a triangular, rectangular or ring-shaped NFT "disk" might be formed in step 102. The disk of the NFT is typically wider than the pin, discussed below, in the cross-track direction. However, the disk of the NFT need not be wider than the pin. The disk portion of the NFT is recessed from the air-bearing surface (ABS) location. The ABS location is the region which will become the ABS, for example after lapping of the slider.

In some embodiments, step 102 includes multiple sub-steps. For example, one or more metallic layers may be deposited at least in the region in which the NFT is to be formed. A mask having the desired shape and location of the disk may then be provided. The exposed portion of the metallic layer(s) may then be removed. Alternatively, a lift-off process might be used. Thus, a mask having an aperture with the shape and location of the disk may be provided. The first material(s) for the disk may be deposited and the mask removed. In other embodiments, other methods of forming the NFT disk may be used.

The NFT pin is formed from second material(s) different from the first material(s) used in the pin, via step 104. Further, step 104 is performed using a lift-off process. At least part of the pin formed is between the disk and the ABS location. In some embodiments, a portion of the pin occupies part of the ABS. However, in other embodiments, the pin may be recessed from the ABS location. The pin also contacts the disk. Thus, the NFT formed includes both the disk and the pin. In some embodiments, the pin is substantially rectangular in cross-section.

The material(s) used for the pin in step 104 are different from the material(s) used for the disk in step 102. Thus, the NFT formed is a composite NFT. The pin may be formed of a dielectric. For example, tantalum oxide (e.g. $Ta_2O_5$), titanium oxide, silicon and/or another dielectric might be used in forming the pin.

Step 104 may also include multiple substeps and involves a lift-off. For example, a mask having an aperture may be provided. At least part of the aperture has a shape and a location of the pin. A remaining portion of the aperture may be used to form all or part of an anchor structure. The second material(s) for the pin are deposited and the mask lifted-off. The pin is formed by at least part of the second material(s) remaining in the aperture's location after lift-off. As a result, the pin takes on the geometry of the aperture in the mask. In some embodiments, the track width of the pin is less than that of the disk. In other embodiments, however, the pin formed in step 104 may be wider in the track width direction than the disk. The pin may, for example, be at least fifty nanometers wide and not more than two hundred nanometers wide in some embodiments. After formation of the NFT pin, the region may be covered with a refill material. One or more planarizations may also be performed. For example, a resist planarization and/or a light chemical mechanical planarization (CMP) might be employed. A resist planarization may include depositing an endpoint detection layer between two refill layers. These refill layers may correspond to cladding for the waveguide. An ion mill planarizes the region around the NFT, terminating in response to detection of the endpoint detection layer. Thus, the NFT may be formed and protected.

Figure 4:
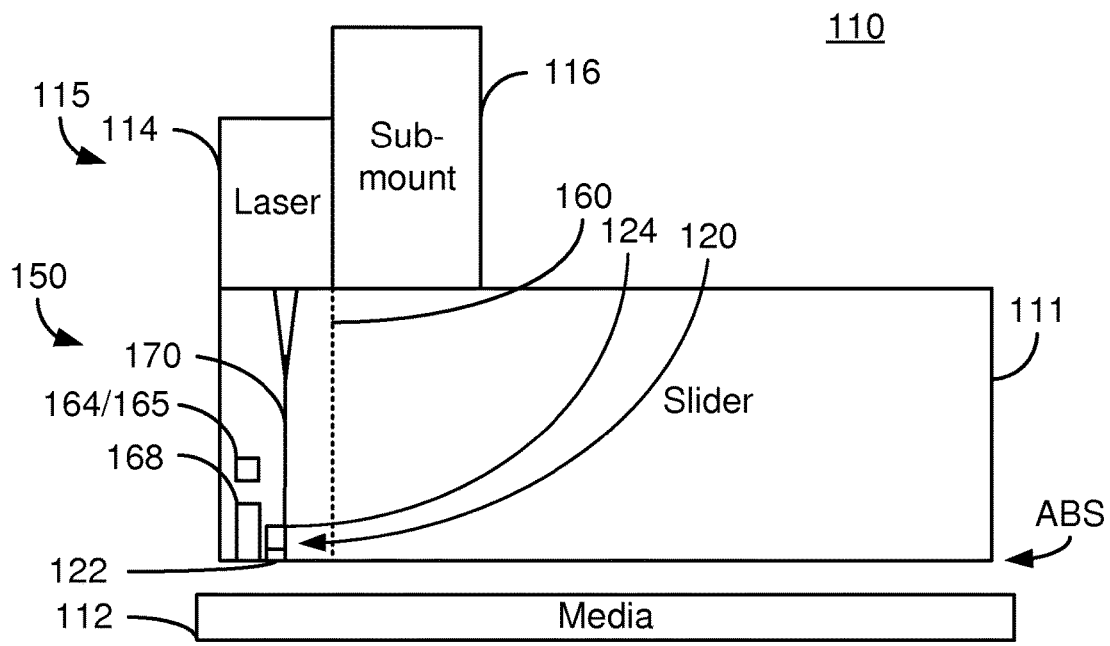
FIG. 4 is a diagram depicting a side view of an exemplary embodiment of a disk drive including a composite NFT formed using an exemplary embodiment of the method.
Figure 5:
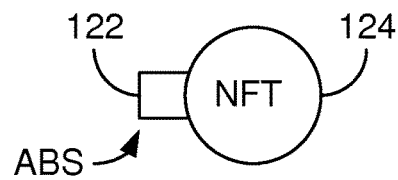
FIG. 5 is a diagram depicting a plan view of an exemplary embodiment of a composite NFT.
Figure 6:
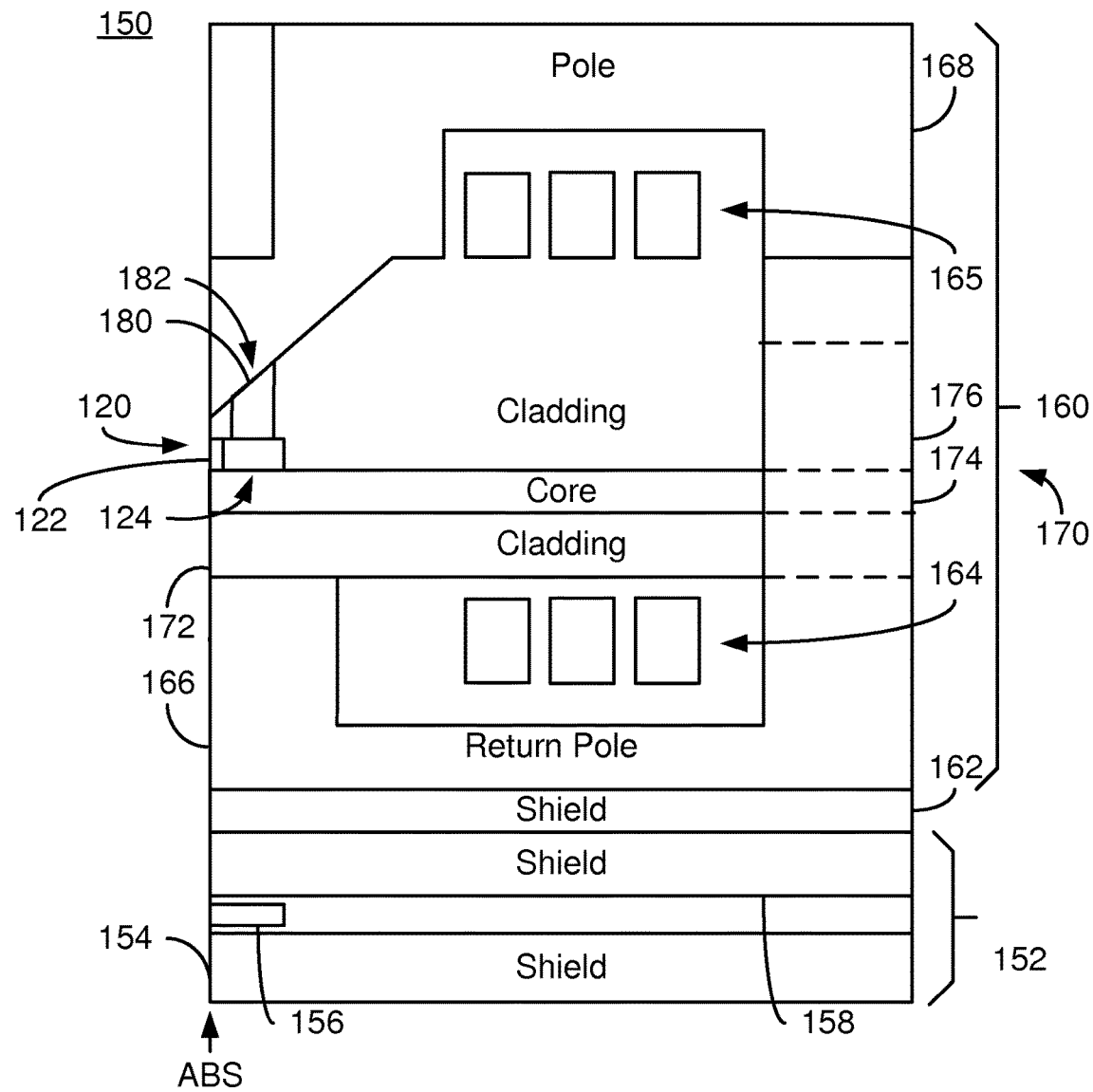
FIG. 6 is a diagram depicting an exemplary embodiment of a HAMR head employing a composite NFT.

Using the method 100 a composite NFT may be fabricated. For example, FIG. 4 depicts a disk drive 110 that includes an NFT 120 formed using the method 100. FIG. 5 depicts a plan view of an NFT 120 formed using the method 100 and that may reside in the disk drive 110. FIG. 6 depicts an embodiment of a head 150 utilizing the NFT 120 formed using the method 100. FIGS. 4-6 are not to scale. Referring to FIGS. 4-6, for simplicity, not all portions of the disk drive 110 and HAMR head 150 are shown. For example, electronics and a suspension that may be used with the disk drive 110 and HAMR head 150 are not shown. In addition, although the disk drive 110 and HAMR head 150 are depicted in the context of particular components other and/or different components may be used. Further, the arrangement of components may vary in different embodiments.

The disk drive 110 includes media 112, a HAMR head 150 residing on a slider 111 and a laser assembly 115. The media 112 may be a disk or other magnetic recording media configured for use in the disk drive 110. The laser assembly 115 includes a laser 114 and submount 115. Although not depicted in FIG. 4, the HAMR head 150 may include a read transducer 152 (shown in FIG. 6). The read transducer 152 includes shields 154 and 158 as well as read sensor 156. The read sensor 156 may be a tunneling magnetoresistance (TMR) sensor. Although being shown as disconnected from the shields 154 and 158, in some embodiments, the read sensor 156 is connected to the shields 154 and 158. In other embodiments, the read transducer 152 may be omitted.

The HAMR head 150 also includes a write transducer 160. The HAMR transducer 160 includes waveguide 170, write pole 168, return pole 166, coil(s) 164 and 165, and shield 162. The coil(s) 164 and 165 may be used to energize the write pole 140 during writing. In the embodiment shown, the shield 162 is depicted as separate from the return pole 166. However, in another embodiment, these components may be combined. The waveguide 170 includes cladding 172 and 176 as well as core 174. Further, the waveguide 170 is shown as residing between the pole 168 and return pole 166. In another embodiment, other configurations are possible. The coils 164 and 165 may form a single, helical coil or may be separate pancake coils. In addition, a grating (not shown in FIGS. 4-6) may be used to couple light from the laser 114 into the waveguide 170.

The HAMR transducer 150 also includes an NFT 120 and optional heat sink 180. The optional heat sink 180 is in thermal contact with the NFT 120. The heat sink 180 also has a top surface 182 in thermal contact with the pole 168. In the embodiment shown, the heat sink 180 is in direct physical contact with the NFT 120 and the pole 168. The top surface 182 of the heat sink 180 is sloped because the bottom surface of the pole 168 is sloped. In the embodiment shown, a portion of the bottom surface of the pole 168 proximate to the ABS is not parallel to the top surface of the NFT 100. In some embodiments, this portion of the bottom surface of the pole 168 may be configured to be parallel to the top surface of the NFT 120.

The NFT 122 includes a disk 124 and a pin 122. The pin 122 is between the disk 124 and the ABS. Thus, the disk 124 is recessed from the ABS. In the embodiment shown, the disk 124 extends further in the track width direction (perpendicular to the plane of the page in FIG. 6) than the pin 122. In other embodiments, another relationship between the widths is possible. In addition, although depicted as having a circular shape in the plan view of FIG. 5, the disk 124 may have another shape. The disk 124 is formed in step 102 of the method 100. Thus, the disk 124 may be metallic. In contrast, the pin 122 is formed in step 104 and may consist of a different material than the disk 124. A dielectric having a low loss, a high index of refraction and mechanical stability may be desired for the pin 122. For example, the pin 122 may be a $Ta_2O_5$ pin. In other embodiments, a silicon or other dielectric pin may be formed. The NFT 120 is, therefore, a composite NFT.

In operation the waveguide 170 directs energy from the laser to the ABS and more specifically to the NFT 120. The NFT 120 is optically coupled with the waveguide 170, receiving energy from the core 174. The NFT 120 is also proximate to the ABS. For example, the NFT 120 is shown as having a surface of the pin 122 occupying part of the ABS. The NFT 120 focuses energy from the waveguide 170 onto a region of the media 112. In particular, a surface plasmon resonance may developed across the disk 124 of the NFT 120. This resonance allows the NFT 120 to deliver optical energy to the media 112 in a small thermal spot. The write pole 168 is configured to write to the region of the media heated by the NFT 120. The heat sink 180 is thermally coupled near its bottom with the NFT 120 and at its top with the bottom surface of the pole 168. During operation, therefore, heat generated at the NFT 120 may be conducted by the heat sink 180 away from the NFT 120 and to the pole 168.

The HAMR transducer 160 and thus the HAMR head 150 may have improved performance and reliability. Because the NFT 120 is formed using the method 100, the NFT 120 may be a composite NFT 120. More specifically, the geometry of the pin 122 may be photolithographically defined. Thus, the pin may have the desired geometry yet be formed of different materials from the disk 124. For example, a dielectric having increased hardness may be used for the pin 122 while a metal is used for the disk 124. The pin 122 is, therefore, more robust and less likely to fail. Performance and reliability of the NFT 120 and HAMR head 150 may thus be improved.

Figure 7:
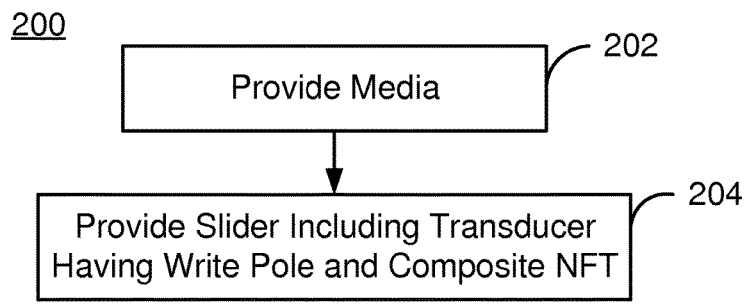
FIG. 7 is a flow chart depicting another exemplary embodiment of a method for providing a disk drive including a composite NFT.

FIG. 7 is a flow chart depicting a method 200 for providing a disk drive such as the disk drive 110 depicted in FIG. 4 and including the head 150. For simplicity, some steps may be omitted, interleaved, and/or combined. The method 200 is also described in the context of providing a single disk drive 110 including a single HAMR transducer. However, the method 200 may be used to fabricate multiple transducers at substantially the same time. The method 200 is also described in the context of particular layers. However, in some embodiments, such layers may include multiple sub-layers. Certain steps of the method 200 may be combined, omitted, performed in another order and/or interleaved. For simplicity, the method 200 is described in the context of the disk drive depicted in FIGS. 4-6.

Referring to FIGS. 4-7, the media 112 is provided, via step 202. The HAMR head 150 residing on a slider is provided, via step 204. Step 204 may thus fabricate or obtain the head 150 depicted in FIGS. 4-6. Also in step 204, the disk drive 110 may be assembled, including affixing the slider to a suspension or analogous structure. Thus, the disk drive 110 may be fabricated. As a result, the benefits of the composite NFT 120 may be achieved.

Figure 8:
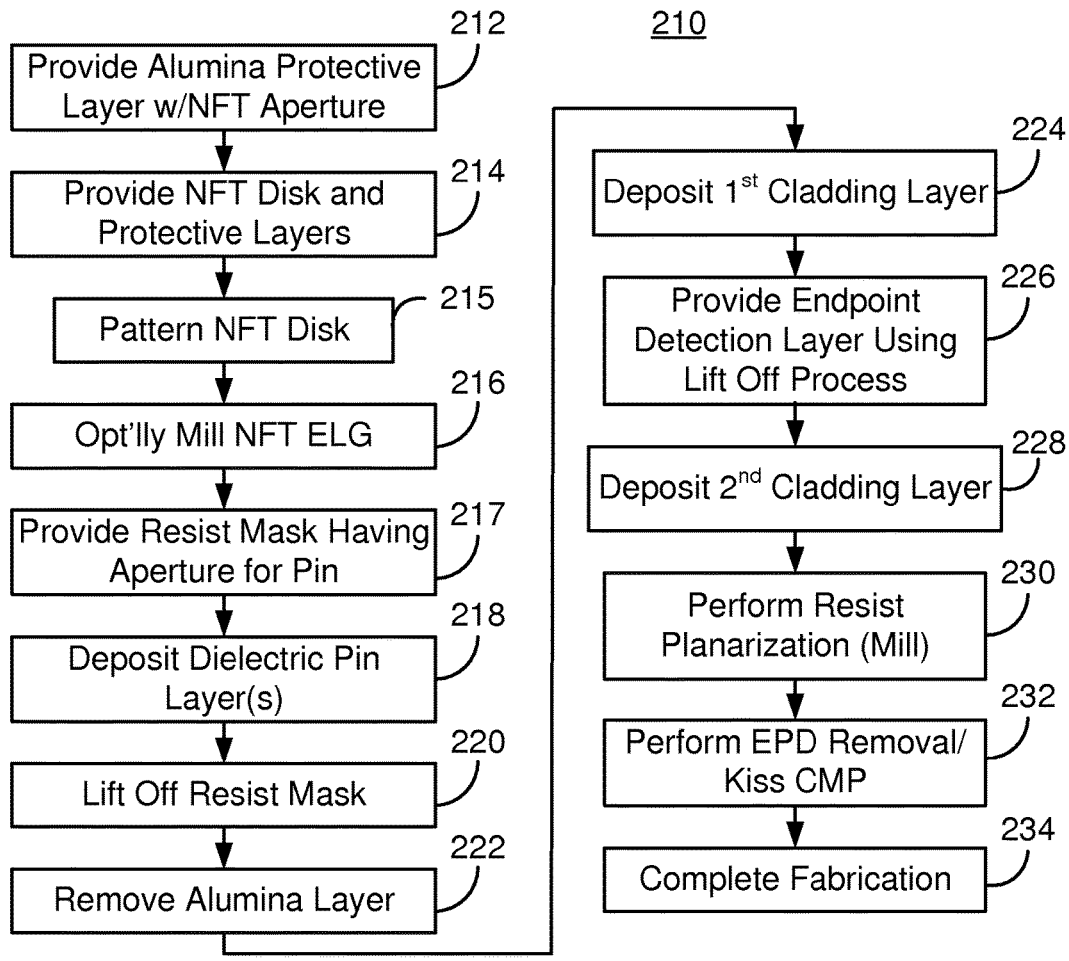
FIG. 8 is a flow chart depicting another exemplary embodiment of a method for providing a composite NFT in a HAMR transducer.

FIG. 8 is a flow chart depicting an exemplary embodiment of a method 210 for fabricating a composite NFT in a HAMR transducer. For simplicity, some steps may be omitted, interleaved and/or combined. FIGS. 9A and 9B-23A and 23B are diagrams depicting various portions of an exemplary embodiment of a magnetic recording transducer 250 during fabrication. For clarity, FIGS. 9A and 9B-23A and 23B are not to scale. Further, although FIGS. 9A and 9B-23A and 23B depict the ABS location (location at which the ABS is to be formed) and the ABS at a particular point in the pole, other embodiments may have other locations for the ABS. Referring to FIGS. 8-23A and 23B, the method 210 is described in the context of the HAMR transducer 250. However, the method 210 may be used to form another device (not shown). The HAMR transducer 250 being fabricated may be part of a merged head that also includes a read head (not shown in FIGS. 9A and 9B-23A and 23B), a laser (not shown in FIGS. 9A and 9B-23A and 23B) and resides on a slider (not shown) in a disk drive. In addition, other portions of the HAMR transducer 250, such as the pole(s), shield(s), coil(s), and remaining optics are not shown. The method 210 also may commence after formation of other portions of the HAMR transducer 250. For example, a tantalum oxide core for the waveguide may have been formed. The method 210 is also described in the context of providing a single HAMR transducer 250 and a single composite NFT in the HAMR transducer 250. However, the method 210 may be used to fabricate multiple transducers and/or multiple heat sinks per transducer at substantially the same time. The method 210 and device 250 are also described in the context of particular layers. However, in some embodiments, such layers may include multiple sub-layers.

FIGS. 9A and 9B depict side and plan views, respectively, of the device area, the grating area and the NFT electronic lapping guide (ELG) area before the method 210 starts. Thus, the cladding 251 and core 252 of the waveguide have been formed. An additional thin cladding layer 253 has also been provided. The cladding 252 and 253 are dielectrics, such as $SiO_2$. The core 252 is a dielectric such as $Ta_2O_5$. In other embodiments, other material(s) may be used. The grating 254 has also been formed. Also shown is the conductive layer 256 used for the NFT ELG. In some embodiments, the conductive layer 256 is a Ru layer.

Figure 10A:
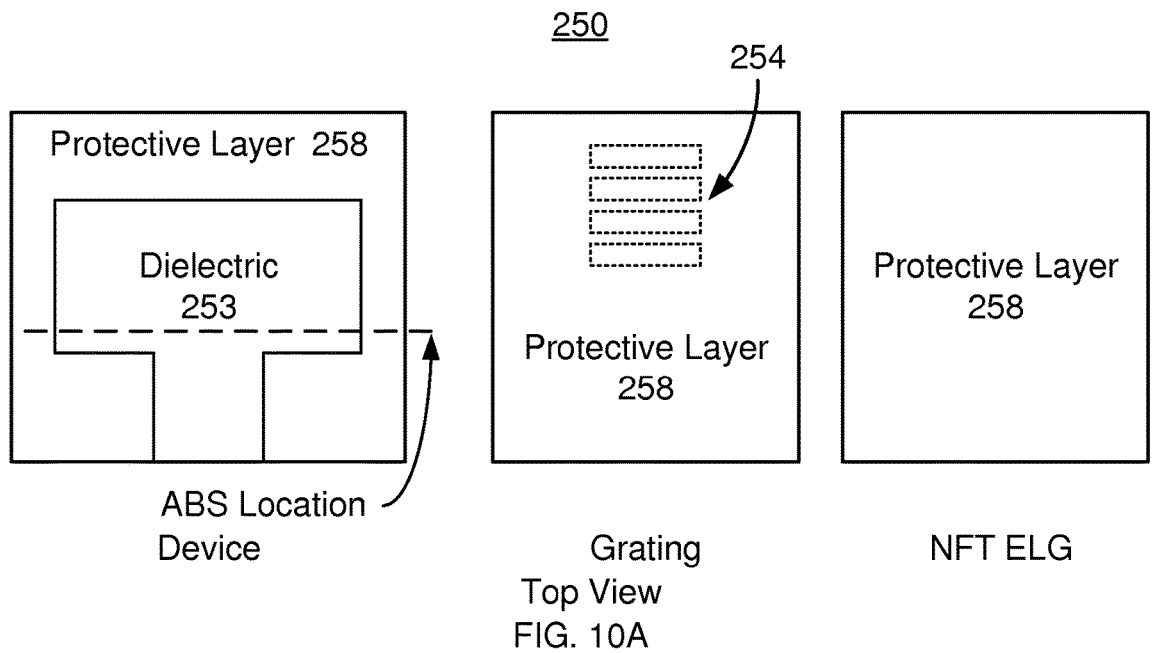
Figure 10B:
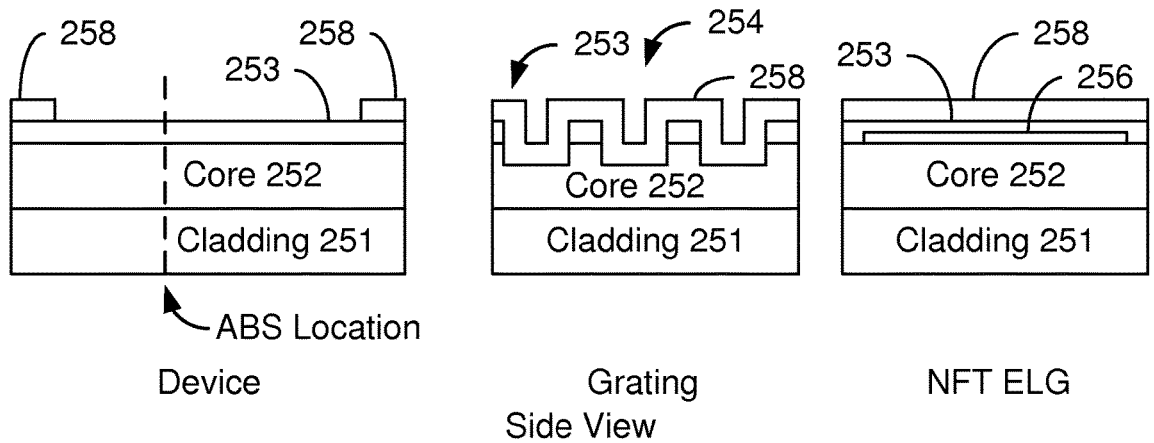

A protective layer having an aperture in the region in which the NFT is to be formed is provided, via step 212. In some embodiments, the protective layer is an aluminum oxide layer having a nominal thickness of sixty nanometers. Step 212 may include depositing the aluminum oxide layer using atomic layer deposition (ALD). However, in other embodiments, other material(s) and/or other deposition methods may be used. FIGS. 10A and 10B depict plan and side views, respectively, of the device, grating and NFT ELG regions after step 212 is performed. Thus, a protective layer 258 has been provided. The grating and NFT ELG regions are covered by the protective layer 258. However, the dielectric (cladding) layer 253 is exposed by the aperture in the protective layer in the device region.

Figure 11A:
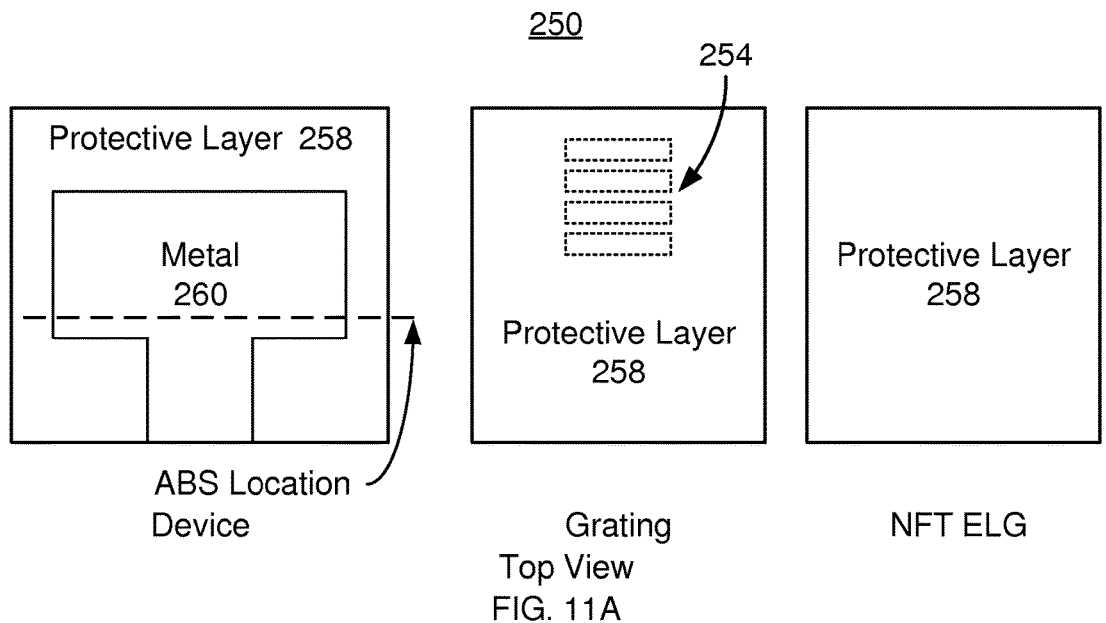
Figure 11B:
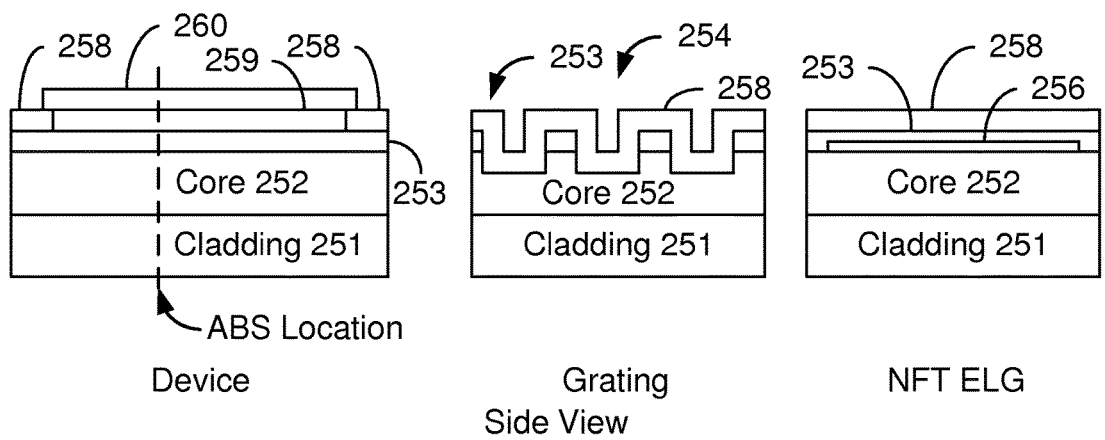

The layer(s) for the disk of the NFT are provided, via step 214. In some embodiments, step 214 includes depositing a stack including a $Ta_2O_5$ layer and a gold layer. FIGS. 11A and 11B depict plan and side views, respectively, of the device, grating and NFT ELG regions after step 212 is performed. Thus, a tantalum oxide layer 259, a gold layer 260 are shown.

Figures 13A, 13B:
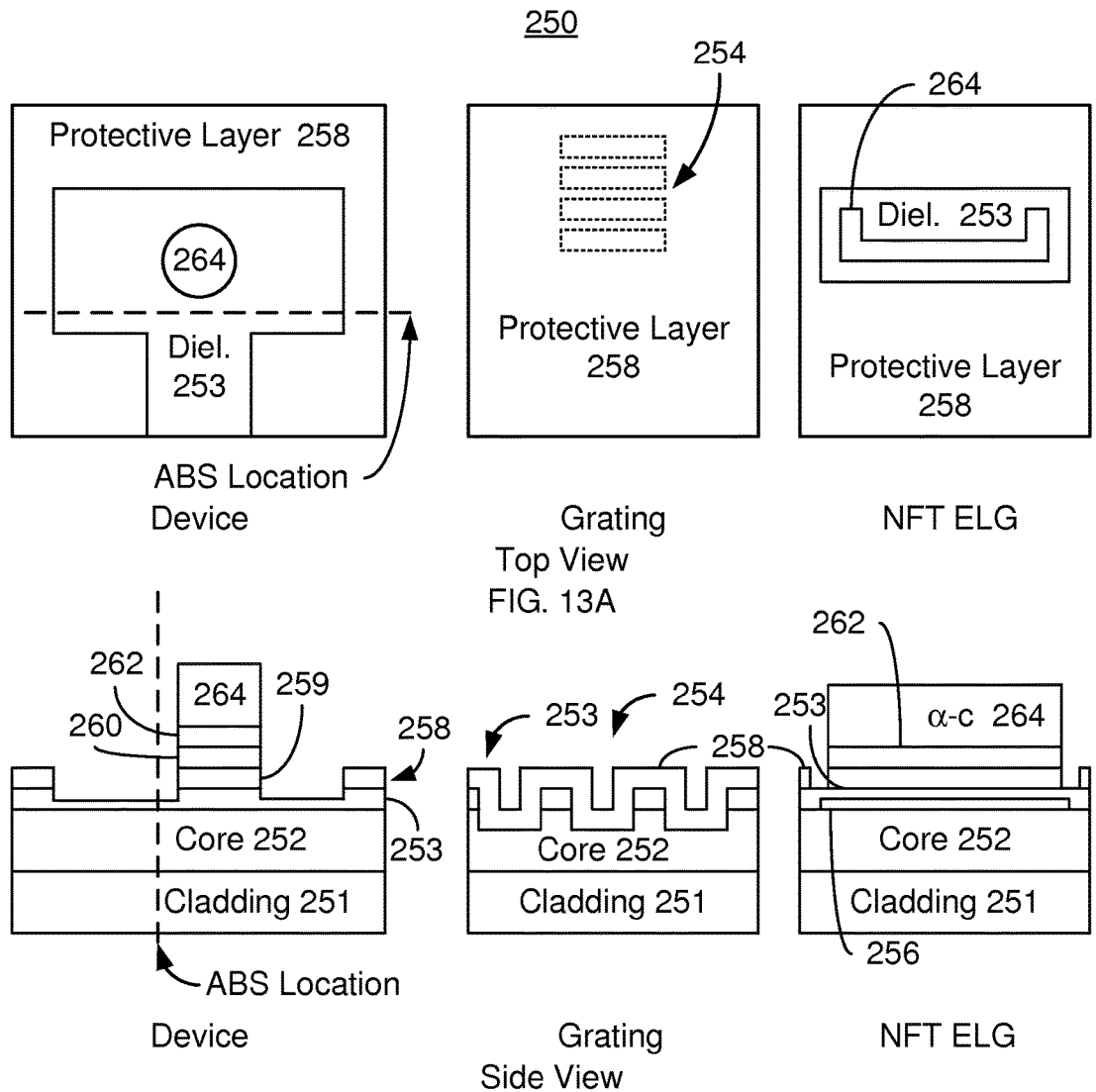

The layers are patterned to form a disk, via step 215. Step 215 includes forming a hard mask. Thus, hard mask layers may be deposited and photolithographically patterned. The underlying layers 259 and 260 may then be patterned. FIGS. 12A and 12B depict plan and side views, respectively, of the device, grating and NFT ELG regions after the hard mask layers are provide as part of step 215. Thus, a silicon oxide layer 262 and amorphous carbon layer 264 (α-carbon) have been formed. The layers 262 and 264 are used as a mask. FIGS. 13A and 13B depict plan and side views, respectively, of the device, grating and NFT ELG regions after step 215 has been performed. Thus, etches or other removal steps appropriate for layers 264, 262, 260 and 259 are performed. For example, layers 259, 262 and 264 may be removed by RIEs, while the gold layer 260 may be removed using an ion mill. A disk has been formed of layers 259, 260, 262 and 264.

Figures 14A, 14B:
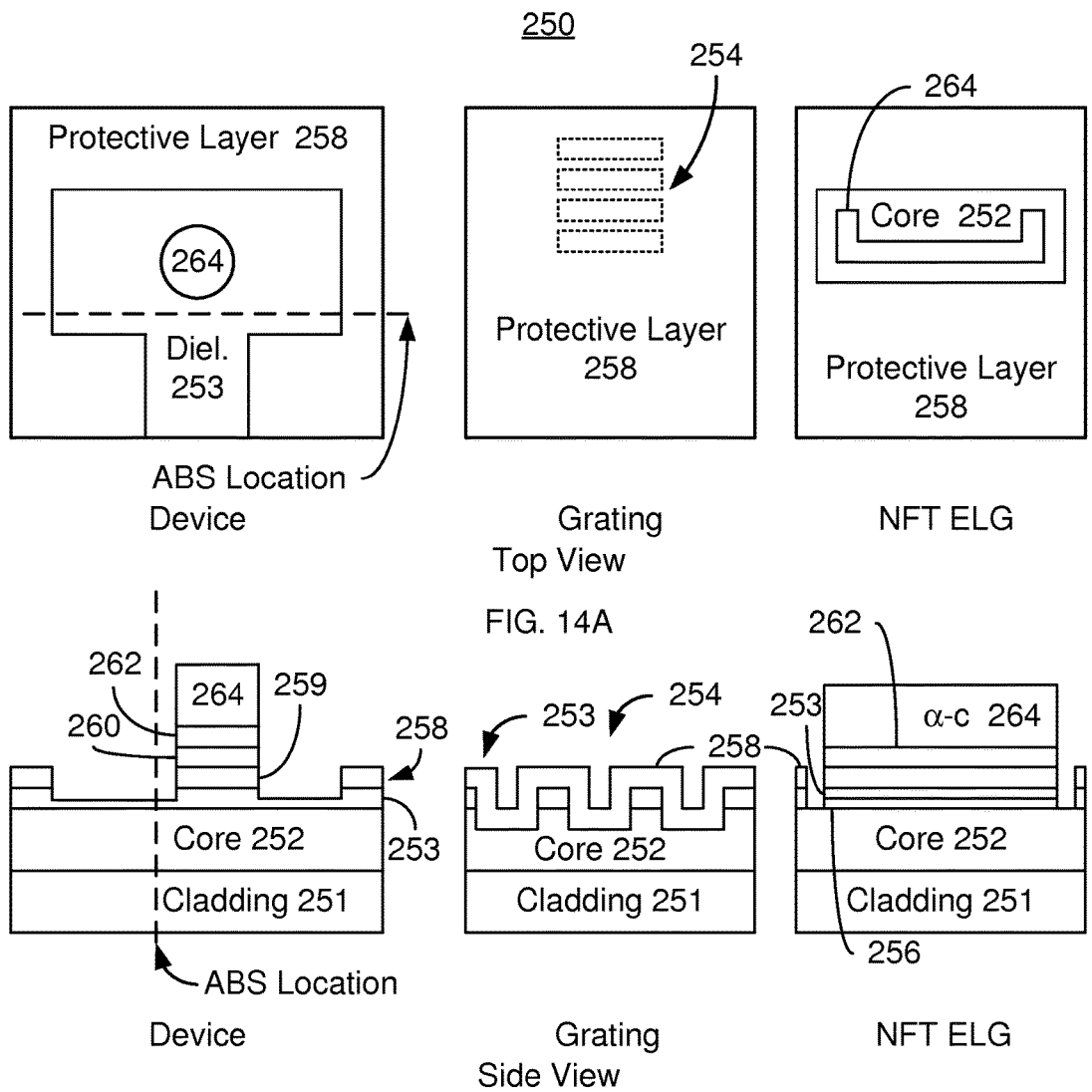

The region of the NFT ELG may be milled, via step 216. For example, the exposed portion of the cladding layer 253 and underlying conductive ELG layer 256 may be milled. FIGS. 14A and 14B depict plan and side views, respectively, of the device, grating and NFT ELG regions after step 216 is performed. Thus, the NFT ELG may be patterned.

A photoresist mask having an aperture for the NFT pin is provided, via step 217. Use of a photoresist mask allows for lift-off and, therefore, easier fabrication of the NFT pin. FIGS. 15A and 15B depict plan and side views, respectively, of the device, grating and NFT ELG regions after step 217 is performed. Thus, a mask 266 with aperture 268 has been formed. As can be seen in FIG. 15B, a portion of the aperture 268 overlaps the disk layers.

The layer(s) for the dielectric pin are deposited, via step 218. In some embodiments, step 218 includes depositing a tantalum oxide pin. In other embodiments, other material(s) may be used. A portion of the layer(s) for the dielectric pin reside on the mask 266. Another portion resides in the aperture 268. The photoresist mask 266 is lifted off, via step 220. FIGS. 16A and 16B depict plan and side views, respectively, of the device, grating and NFT ELG regions after step 220 is performed. Thus, the remaining dielectric 270 is shown. The dielectric 270 has a pin portion near the disk and an anchor portion on the opposite side of the ABS location from the disk. The dielectric layer 270 may be nominally twenty nanometers thick. In some embodiments, the length of the pin layer 270 from the ABS to the disk is desired to be at least ten nanometers and not more than fifteen nanometers. As can be seen in FIG. 16B, the ABS location is within the portion of the dielectric layer 270 on the side of the layers 259, 260, 262 and 264. Thus, in the embodiment shown, the pin of the NFT is formed from the portion of the dielectric layer 270 deposited on the sides of the disk. In some embodiments, therefore, the thickness of the dielectric layer 270 deposited is greater than the length of the pin.

Figure 17A:
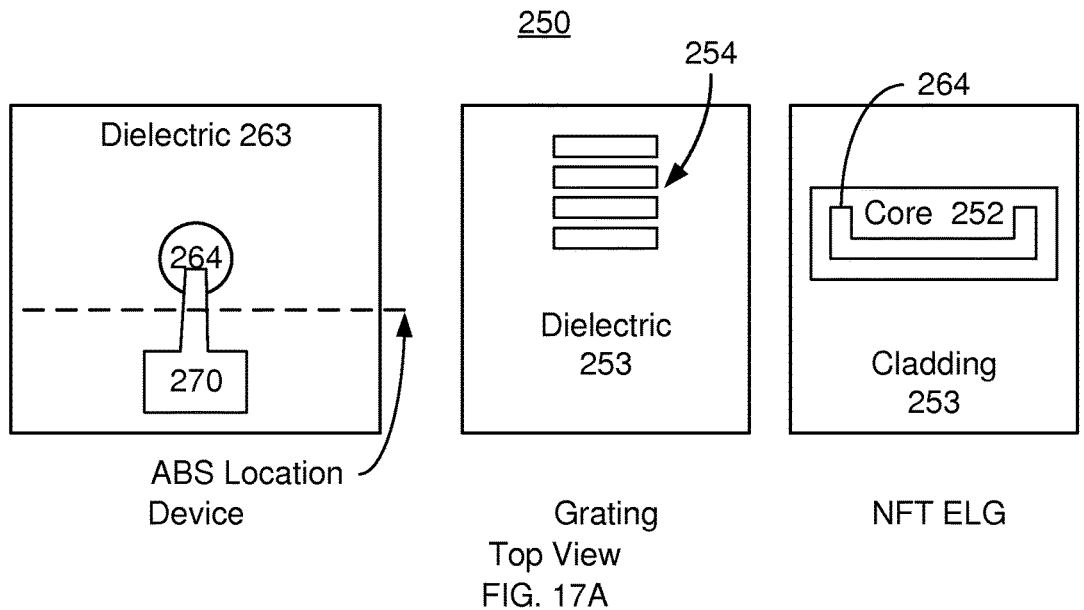
Figure 17B:
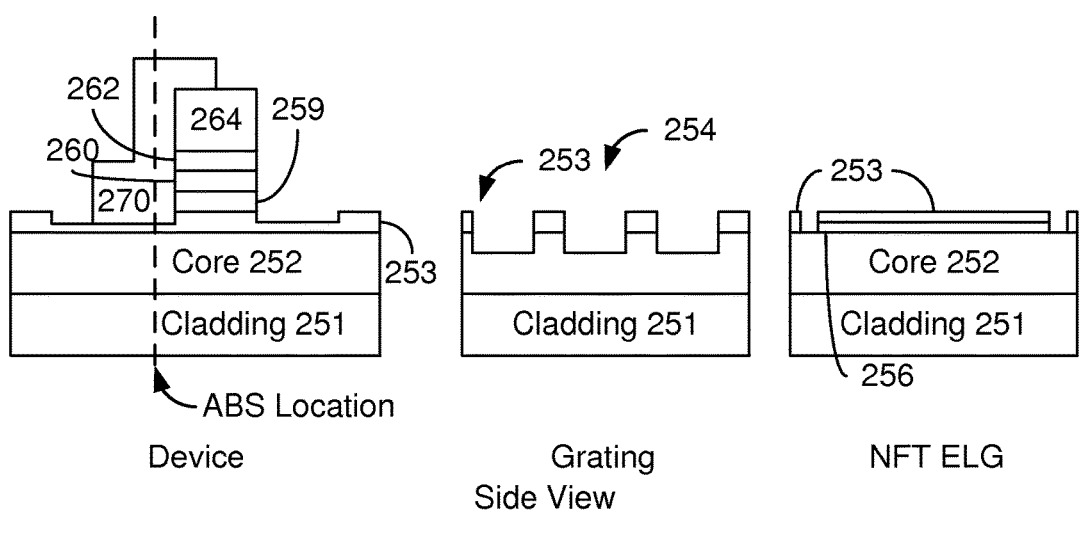

The alumina protective layer is removed, via step 222. In some embodiments, step 222 includes performing an alumina wet etch. FIGS. 17A and 17B depict plan and side views, respectively, of the device, grating and NFT ELG regions after step 222 is performed. Thus, the protective layer 258 has been removed.

Figure 18A:
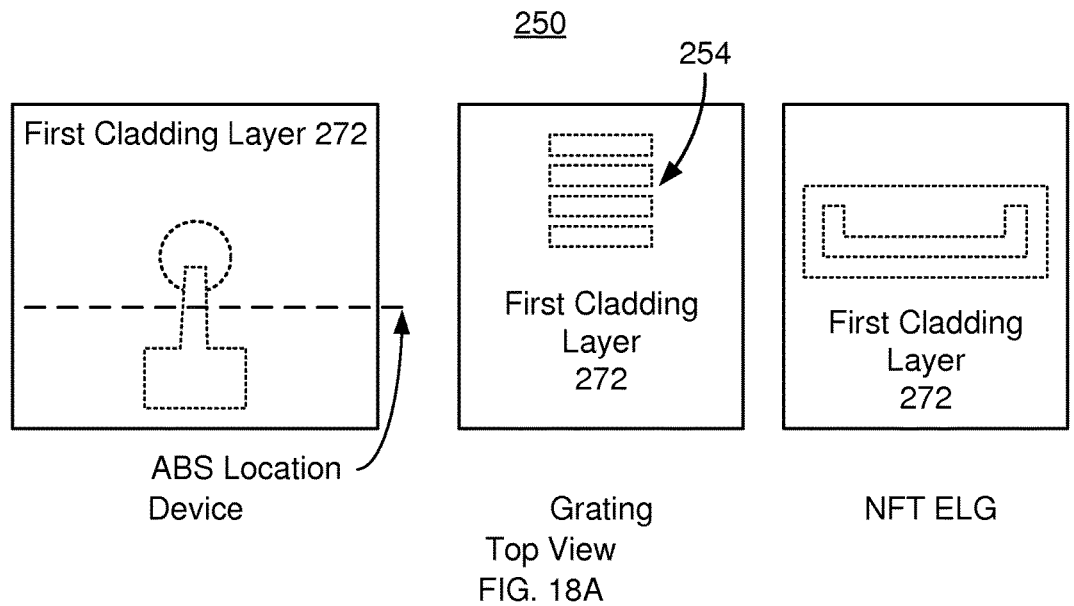
Figure 18B:
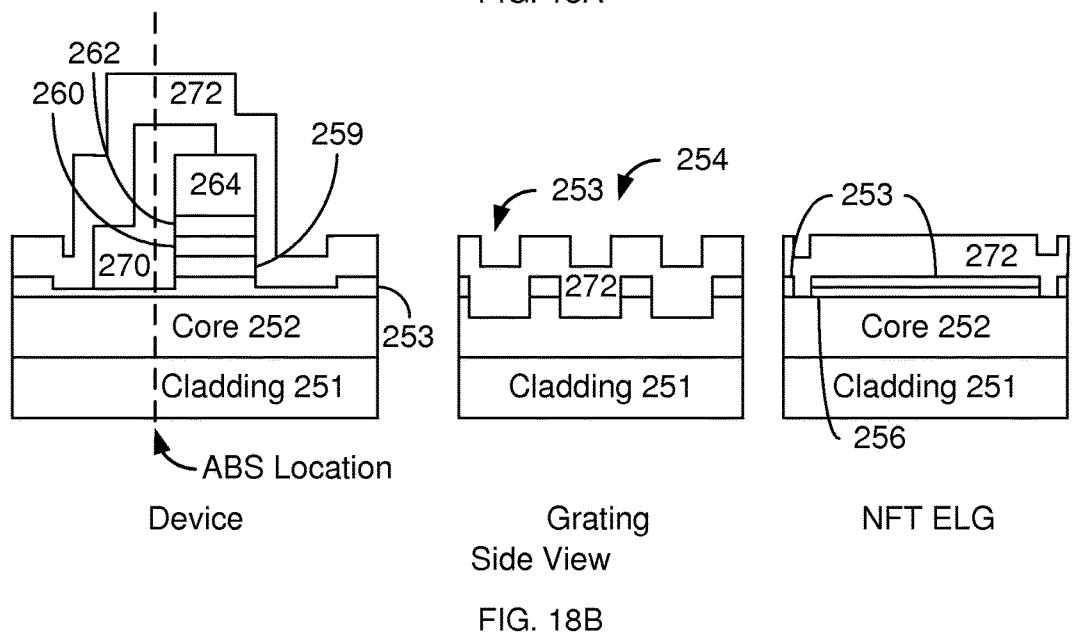

A first cladding, or dielectric, layer is deposited, via step 224. In some embodiments, a silicon dioxide layer is deposited in step 224. The thickness of the layer may be at least fifty nanometers in some embodiments and not more than seventy-five nanometers. FIGS. 18A and 18B depict plan and side views, respectively, of the device, grating and NFT ELG regions after step 224 is performed. Thus, the first cladding layer 272 has been deposited. In some embodiments, the first cladding layer 272 has a top surface at the same height as the top of the gold layer 260 in the region around which the NFT is being formed. Thus, the thickness of the first cladding layer 272 may depend upon the thickness of the NFT disk.

An endpoint detection layer is deposited, via step 226. In some embodiments, ten nanometers of amorphous carbon is deposited in step 226. In other embodiments, Ta may be used for the endpoint detection layer. FIGS. 19A and 19B depict plan and side views, respectively, of the device, grating and NFT ELG regions after step 226 is performed. Thus, the endpoint detection (EPD) layer 274 is shown. In the embodiment shown, the EPD layer is deposited in substantially the same location that the alumina protective layer 258 occupied. Thus, a lift-off process is used to pattern the EPD layer 274 in step 226. For example, a photoresist mask covering part of the device area and part of the NFT ELG region is provided. The EPD layer 274 is deposited and the mask lifted off. The remaining EPD layer 274 is shown in FIGS. 19A and 19B.

Figure 20A:
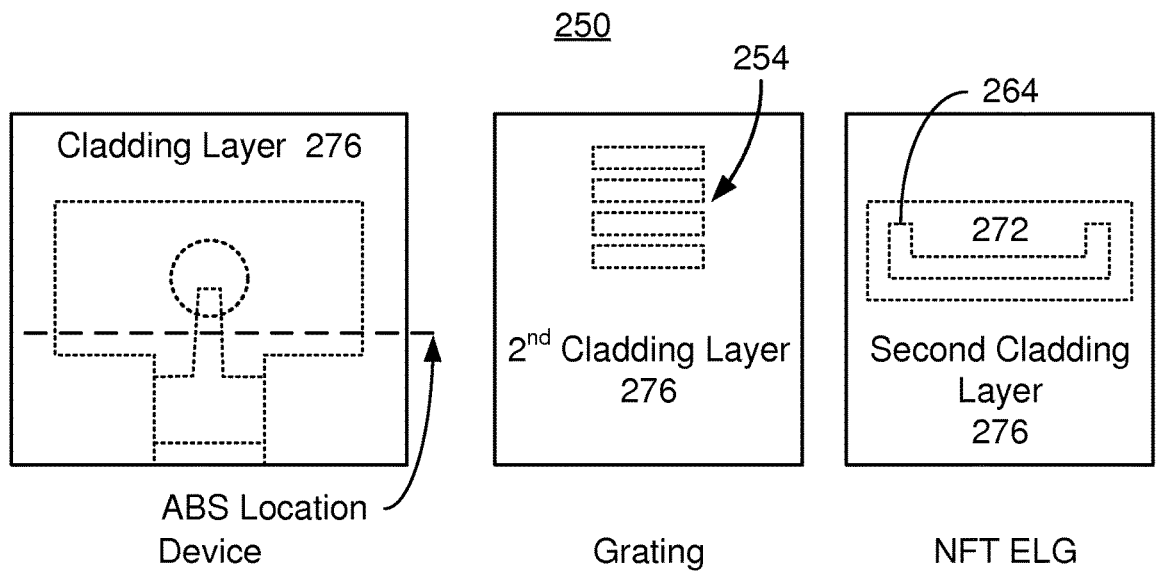
Figure 20B:
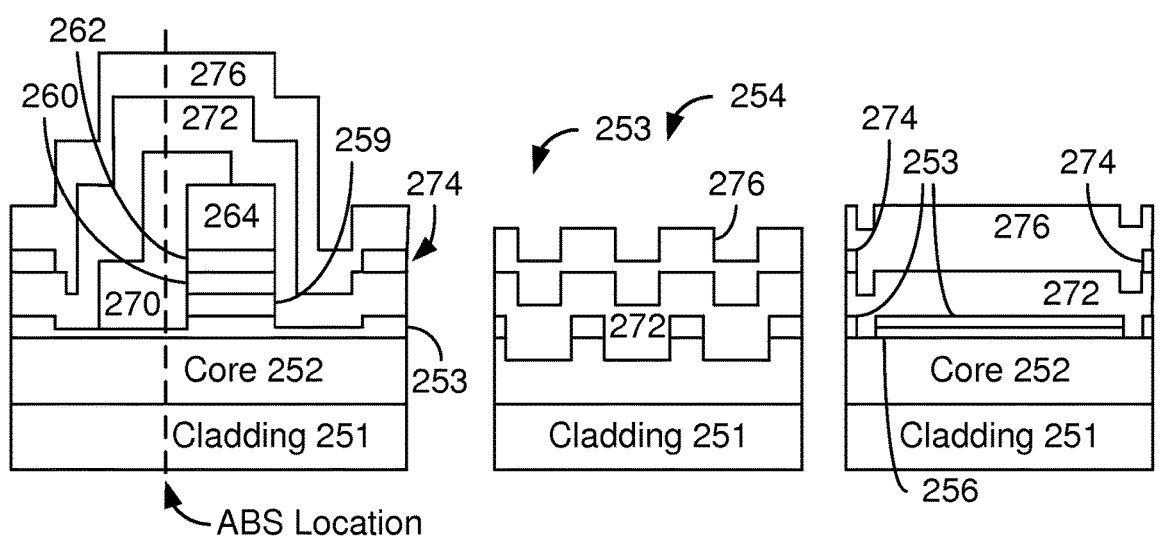

A second cladding layer is deposited, via step 228. Thus, an additional dielectric layer is deposited. In some embodiments, a silicon dioxide layer that is nominally fifty nanometers thick is provided in step 228. FIGS. 20A and 20B depict plan and side views, respectively, of the device, grating and NFT ELG regions after step 228 is performed. Thus, an additional cladding layer 276 has been provided.

Figure 21A:
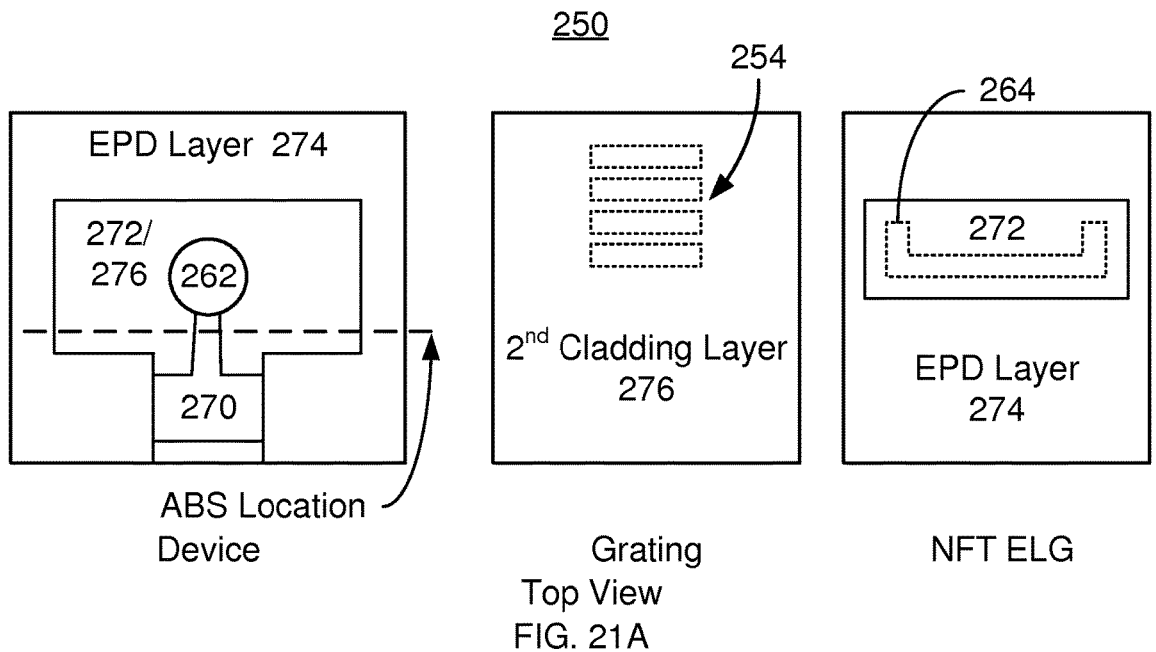
Figure 21B:
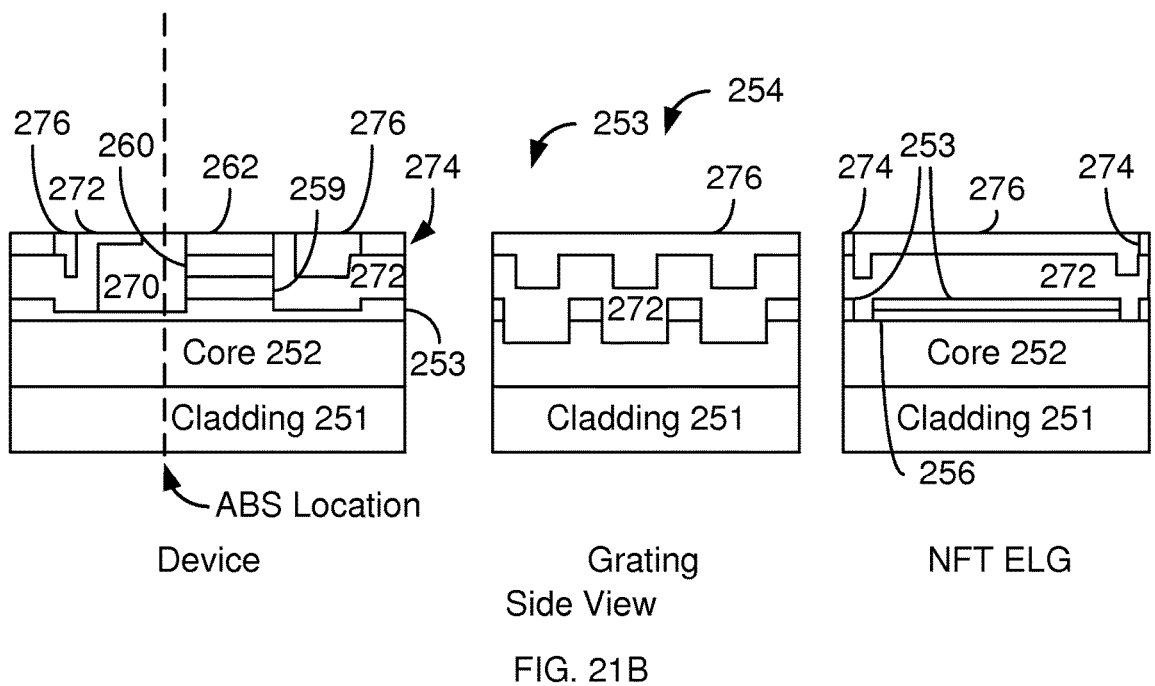

A planarization step is then performed, via step 230. In some embodiments, a resist planarization is performed in step 230. For example, the top layer(s) 272 and 276 may be ion milled. The ion mill terminates based on detection of the EPD layer 274. FIGS. 21A and 21B depict plan and side views, respectively, of the device, grating and NFT ELG regions after step 230 is performed. Thus, the top surfaces of the remaining portions of layers 276, 272 and 262 are substantially level with the top surface of the remaining portion of the EPD layer 274.

Figure 22A:
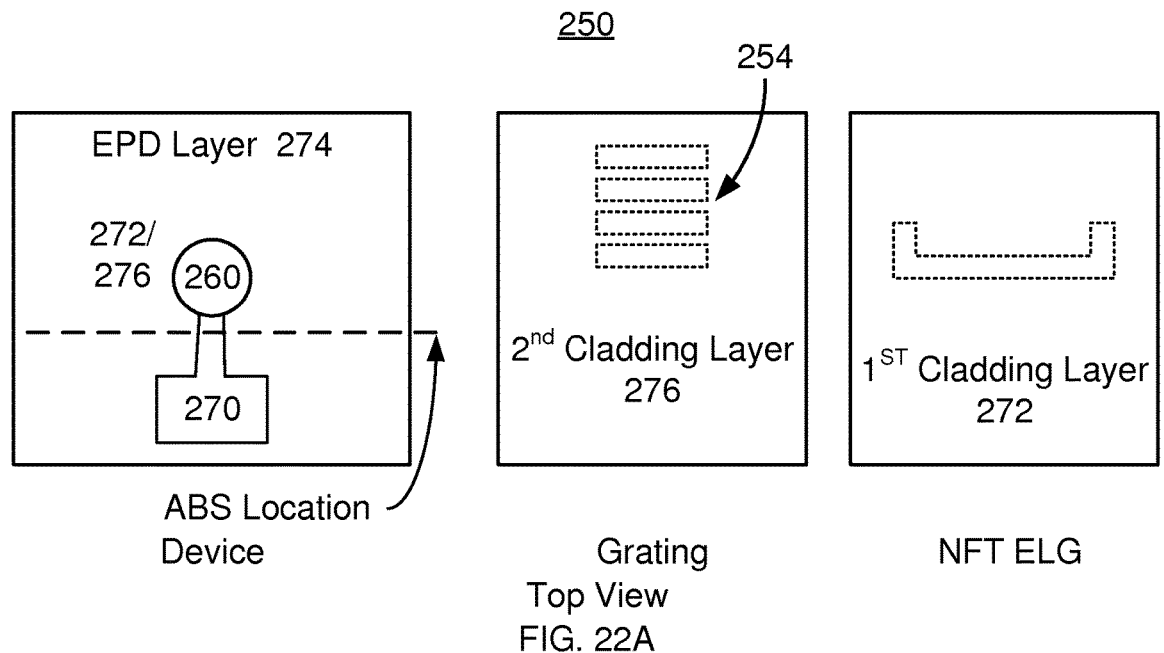
Figure 22B:
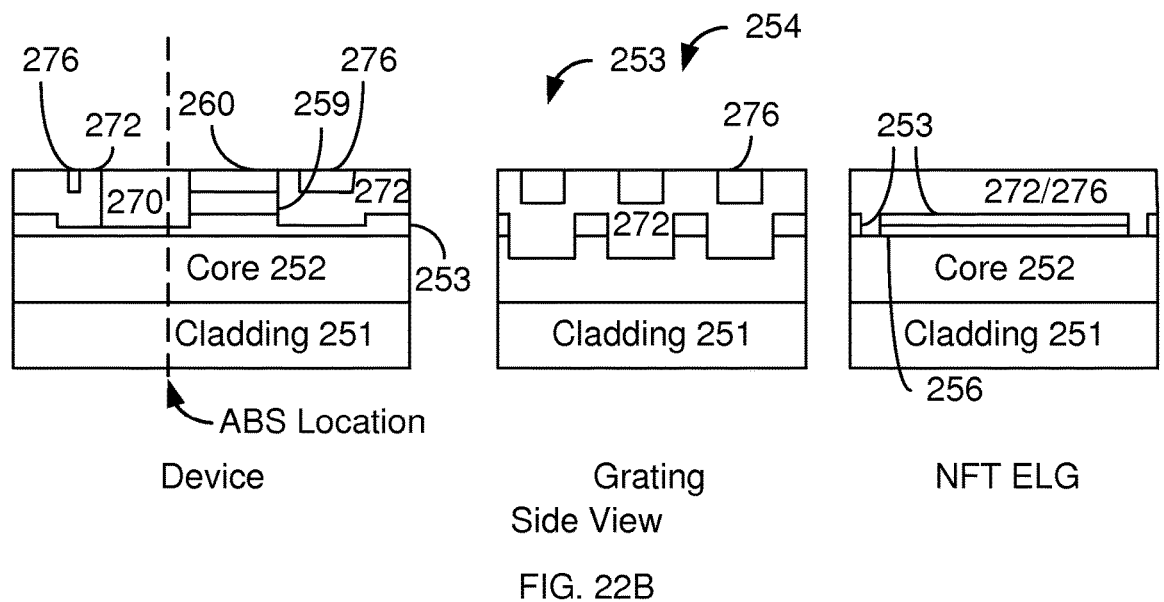

The EPD layer 274 is removed, via step 232. For an amorphous carbon EPD layer 274, the layer 274 may simply be burned off. This process may also remove the amorphous carbon layer 264 on the disk. Further, the top surface of the transducer 250 may no longer be flat. Consequently, a thin cladding layer may be deposited and an additional planarization, such as a light (or kiss) CMP, may performed in step 232. This step removes the EPD layer 274 while allowing the top surface of the transducer 250 to remain substantially planar. FIGS. 22A and 22B depict plan and side views, respectively, of the device, grating and NFT ELG regions after step 232. Thus, the EPD layer 274 has been removed. The top amorphous carbon layer 264 of the disk has also been removed in step 232. The gold disk 260 for the NFT has also been exposed.

Figure 23A:
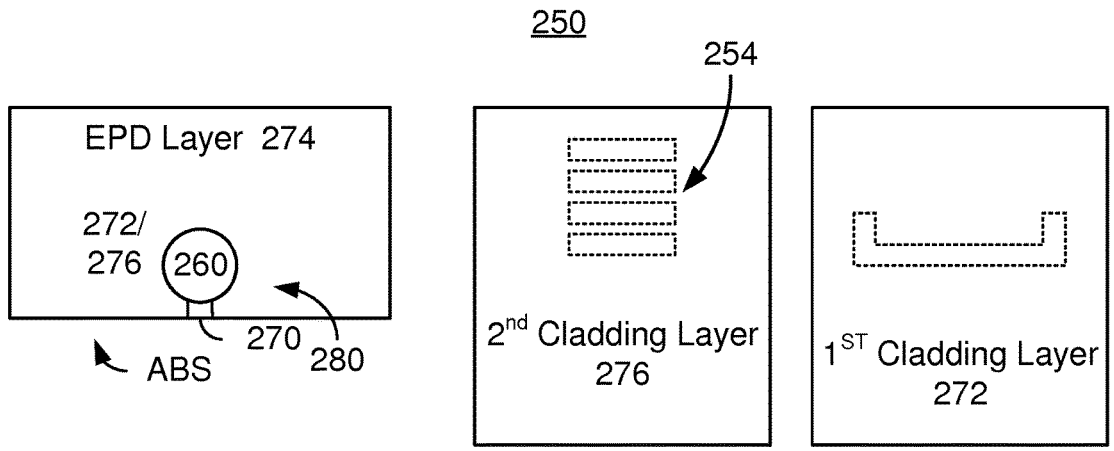
Figure 23B:
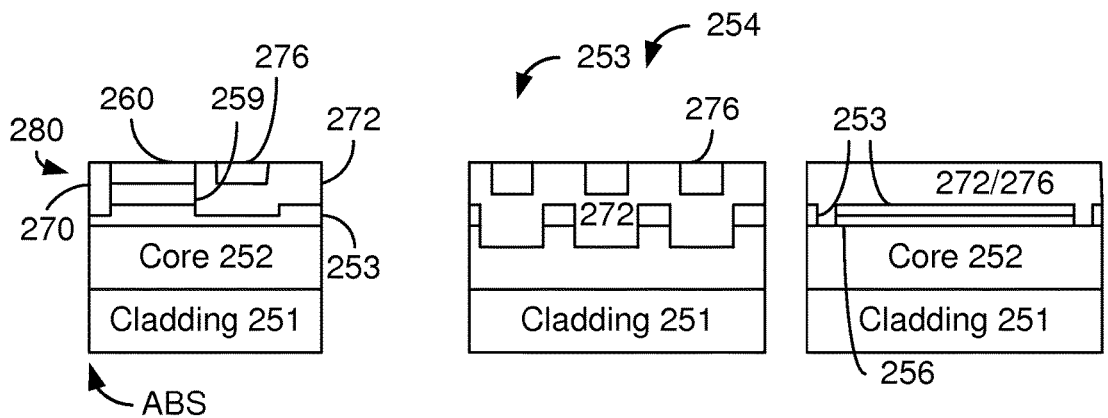

Fabrication of the HAMR transducer 250 may then be completed, via step 234. For example, regions around the NFT may be refilled and other structures formed. Further, the device may be lapped back to the ABS location. FIGS. 23A and 23B depict plan and side views, respectively, of the device, grating and NFT ELG regions after at least part of step 234 is performed. Thus, the ABS has been exposed, for example by lapping. Further, the composite NFT 280 is formed by the metallic disk 260 and the dielectric pin 270. As can be seen in FIG. 23B, a portion of the pin 270 is at the ABS, while the metallic disk 260 is recessed from the ABS. In the embodiment shown, the disk 260 is wider than the pin 270. In other embodiments, however, other configurations may be used.

Thus, using the method 210, the HAMR transducer 250 may be fabricated. The HAMR transducer has an NFT 280 having the desired geometry, including pin width, as well as the desired combination of materials. The method 210, NFT 280, and HAMR transducer 250 share the benefits of the method 100, the NFT 120 and the HAMR head 150. Consequently, manufacturing, reliability, and performance of the HAMR transducer 250 may be improved.

We claim:

1. A method for providing a near-field transducer (NFT) for a heat assisted magnetic recording (HAMR) device, the method comprising:
   forming disk of the NFT from a first material;
   forming a pin of the NFT from at least a second material different from the first material, the pin contacting the disk, at least a portion of the pin residing between the disk and an air-bearing surface (ABS) location, wherein forming the pin further includes:
      providing a mask having an aperture therein, at least a portion of the aperture having a shape and a location of the pin;
      depositing the at least the second material; and
      lifting off the mask, wherein the mask is a photoresist mask; and
   providing an alumina protective layer comprising a NFT aperture therein, the NFT aperture exposing a region including the disk and the pin.

2. The method of claim 1 wherein the first material is a metal and the at least the second material includes a dielectric.

3. The method of claim 1 further comprising:
   removing the alumina protective layer after lifting off the mask.

4. The method of claim 1 wherein forming the pin further includes:

providing at least one dielectric layer; and
planarizing the at least one dielectric layer.

5. The method of claim 4 wherein providing the at least one dielectric layer further includes:
providing a first cladding layer; and
providing a second cladding layer on the first cladding layer.

6. The method of claim 5 wherein forming the pin further includes:
depositing an endpoint detection layer on the first cladding layer, the endpoint detection layer being between the first cladding layer and the second cladding layer.

7. The method of claim 6 wherein planarizing includes performing a resist planarization.

8. The method of claim 7 wherein planarizing further includes a chemical mechanical planarization.

9. A method for providing a near-field transducer (NFT) for use in a heat-assisted magnetic recording (HAMR) device comprising:
providing an alumina protective layer having a NFT aperture therein, the NFT aperture exposing a region including an NFT location;
forming disk of the NFT from at least one metal, the disk residing in the NFT aperture;
forming a pin of the NFT from at least one dielectric, the pin residing in the NFT aperture, a portion of the pin contacting a portion of the disk and residing between the disk and an air-bearing surface (ABS) location, wherein forming the pin further including:
providing a resist mask comprising an aperture therein, at least a portion of the aperture having a shape and a location corresponding to the pin;
depositing the at least one dielectric;
lifting off the resist mask, a remaining portion of the at least one dielectric including the pin;
removing the alumina protective layer after the step of lifting off the mask;
providing a first cladding layer, the first cladding layer including silicon oxide;
depositing a Ta endpoint detection layer on the first cladding layer;
providing a second cladding layer on the Ta endpoint detection layer, the second cladding layer including the silicon oxide;
resist planarizing the at least one dielectric layer; and
performing a chemical mechanical planarization after the resist planarization.

* * * * *